(12) United States Patent
An et al.

(10) Patent No.: US 9,694,652 B2
(45) Date of Patent: Jul. 4, 2017

(54) VEHICLE REAR CONSOLE DUCT AIR FLOW

(71) Applicant: DOOWON CLIMATE CONTROL CO., LTD, Asan-si, Chungcheongnam-do (KR)

(72) Inventors: Byung Guk An, Asan-si (KR); Joon Hong Choi, Asan-si (KR)

(73) Assignee: DOOWON CLIMATE CONTROL CO., LTD, Asan-si, Chungcheongnam-do (KR)

( * ) Notice: Subject to any disclaimer, the term of this patent is extended or adjusted under 35 U.S.C. 154(b) by 1034 days.

(21) Appl. No.: 13/935,738

(22) Filed: Jul. 5, 2013

(65) Prior Publication Data
US 2014/0194047 A1   Jul. 10, 2014

(30) Foreign Application Priority Data

Jan. 8, 2013 (KR) .................. 10-2013-0002181
May 6, 2013 (KR) .................. 10-2013-0050874

(51) Int. Cl.
*B60H 1/34* (2006.01)
*B60H 1/00* (2006.01)
*B60H 1/24* (2006.01)

(52) U.S. Cl.
CPC ....... *B60H 1/3414* (2013.01); *B60H 1/00064* (2013.01); *B60H 1/244* (2013.01);
(Continued)

(58) Field of Classification Search
CPC .............. B60H 1/00064; B60H 1/3414; B60H 2001/00092; B60H 2001/002; B60H 1/00457; B60H 1/00464
(Continued)

(56) References Cited

U.S. PATENT DOCUMENTS 4,759,269 A * 7/1988 Brown ............... G05D 23/1917
                                                    165/217
5,181,553 A * 1/1993 Doi .................... B60H 1/00842
                                                    165/203
(Continued)

FOREIGN PATENT DOCUMENTS

DE  DE 102010008344 A1 * 8/2011 ............... B60H 1/24
JP         2008081029 A * 4/2008
(Continued)

OTHER PUBLICATIONS

Kato, Shinobu (JP 2008081029A), Air Conditioner for Vehicle. Machine translation via European Patent Office ESPACENET,worldwide.espacenet.com.*

*Primary Examiner* — Alissa Tompkins
*Assistant Examiner* — Frances F Hamilton
(74) *Attorney, Agent, or Firm* — Paratus Law Group, PLLC

(57) ABSTRACT

Rear console duct air flow of an air conditioner for a vehicle is provided. An inlet of the rear console duct which is in fluid communication with a rear console register is located at a position where conditioned-air which passes through an evaporator and a heater core flows. The inlet of the rear console is always opened such that the conditioned-air is always introduced into the rear console duct when the air conditioner is operated. A guide member, which guides the conditioned-air to the rear console register through the rear console duct, is disposed between the rear console duct inlet and a face duct inlet that is in fluid communication with a face register. An end of a face door selectively contacts the guide member selectively contacts the guide member when the face door makes a turning movement.

4 Claims, 3 Drawing Sheets

(52) U.S. Cl.
CPC ........ *B60H 1/247* (2013.01); *B60H 2001/002* (2013.01); *B60H 2001/00092* (2013.01)

(58) Field of Classification Search
USPC ................................ 454/127, 108, 144, 143
See application file for complete search history.

(56) References Cited

U.S. PATENT DOCUMENTS

| | | | | |
|---|---|---|---|---|
| 5,186,237 | A * | 2/1993 | Adasek | B60H 1/00064 165/101 |
| 5,511,842 | A * | 4/1996 | Dillon | B60N 2/24 224/400 |
| 6,045,444 | A * | 4/2000 | Zima | B60H 1/00028 165/103 |
| 6,607,029 | B2 * | 8/2003 | Danieau | B60H 1/00021 165/203 |
| 8,187,063 | B2 * | 5/2012 | Kanemaru | B60H 1/00064 454/75 |
| 8,608,532 | B2 * | 12/2013 | Kumar | B60H 1/00564 138/115 |
| 8,931,712 | B2 * | 1/2015 | Nagano | A61L 9/12 165/202 |
| 8,997,837 | B2 * | 4/2015 | Kakizaki | B60H 1/00064 165/42 |
| 9,180,752 | B2 * | 11/2015 | Buczek | B60H 1/00064 |
| 2001/0001417 | A1 * | 5/2001 | Beck | B60H 1/00064 165/203 |
| 2006/0116061 | A1 * | 6/2006 | Alberternst | B60H 1/00064 454/2 |
| 2009/0270022 | A1 * | 10/2009 | Kumar | B60H 1/00564 454/141 |
| 2010/0116568 | A1 * | 5/2010 | Kadoi | B60H 1/00278 180/65.1 |
| 2010/0173577 | A1 * | 7/2010 | Lummitsch | B60H 1/00457 454/143 |
| 2013/0146248 | A1 * | 6/2013 | Kim | B60H 1/00692 165/42 |
| 2013/0288586 | A1 * | 10/2013 | Jang | B60H 1/00678 454/152 |
| 2014/0087646 | A1 * | 3/2014 | Kitamura | B60H 1/00064 454/126 |
| 2016/0167477 | A1 * | 6/2016 | Kang | B60H 1/00564 165/204 |

FOREIGN PATENT DOCUMENTS

| | | |
|---|---|---|
| KR | 10-2004-0102786 A | 12/2004 |
| KR | 20120020573 A * | 3/2012 |
| KR | 20140028498 A * | 3/2014 |

* cited by examiner

VEHICLE REAR CONSOLE DUCT AIR FLOW

CROSS-REFERENCE TO RELATED PATENT APPLICATION

This application claims the benefit of Korean Patent Applications Nos. 10-2013-0002181, filed on Jan. 8, 2013 and 10-2013-0050874, filed on May 6, 2013, in the Korean Intellectual Property Office, the disclosure of which is incorporated herein in its entirety by reference.

BACKGROUND OF THE INVENTION

1. Field of the Invention

The present invention relates to an air conditioner for a vehicle, and more particularly, to an air conditioner for a vehicle that is capable of reducing manufacturing cost and improving an air conditioning efficiency of the entire interior of the vehicle.

2. Description of the Related Art

In general, air conditioners for vehicles are devices that perform heating and air conditioning on an interior of a vehicle by heating or cooling air introduced from the outside and by blowing air into the interior of the vehicle, wherein cold air cooled by an evaporator or hot air heated by a heater core is supplied to each usage source through a face vent, a defrost vent and a floor vent formed in an air conditioning case and doors that are mounted in the air conditioning case so as to make a turning movement and adjust a degree of openness are provided in the vents.

As an example of air conditioners for vehicles, Korean Patent Laid-open Publication No. 2004-0102786 discloses an air conditioner for a vehicle that includes an air conditioning case, an evaporator and a heater core, an air mixing door, a door that opens/closes the rear of the heater core, an air mixing chamber in which air that respectively passes through the evaporator and the heater core is mixed, and a rear console duct having an inlet terminal directed toward the air mixing chamber and for guiding air to be supplied to rear seats, wherein a rear console door for selectively opening/closing the rear console duct is installed at an inlet of the rear console duct.

However, the above-described air conditioner for the vehicle according to the related art has a structure in which an additional rear console door and a dedicated actuator for driving the rear console door are provided and air is discharged toward the rear console duct through the rear console door and the actuator. Thus, due to an increase in manufacturing cost caused by an increase in the number of components, the above-described air conditioner for the vehicle according to the related art is economically infeasible, and the structure of the above-described air conditioner for the vehicle according to the related art is complicated, which is not productive.

In addition, the above-described air conditioner for the vehicle according to the related art has a structure in which air is mainly discharged toward front seats of the interior of the vehicle such that an air conditioning efficiency of the entire interior of the vehicle is not good.

SUMMARY OF THE INVENTION

The present invention provides an air conditioner for a vehicle that is capable of reducing manufacturing cost to improve economical feasibility, simplifying a structure to improve productivity and improving an air conditioning efficiency of the entire interior of the vehicle.

According to an aspect of the present invention, there is provided an air conditioner for a vehicle, including: an air conditioning case including a rear console vent through which introduced air is discharged toward a rear console, a defrost vent through which air is discharged toward a front window, a face vent through which air is discharged in a direction of a front passenger, and a foot vent through which air is discharged in a foot direction of front and rear seats; a door unit including a defrost door, a face door, and a foot door that are rotatably disposed in the air conditioning case and adjust a degree of openness of each of the defrost vent, the face vent, and the foot vent; and a door driving unit that individually drives and controls the defrost door, the face door, and the foot door and establishes an air conditioning mode, wherein an inlet of a rear console duct that interacts with the rear console vent is opened in normal times in each air conditioning mode so that air is able to be always discharged.

The inlet of the rear console duct may be placed between a face duct inlet that interacts with the face vent and a foot duct inlet that interacts with the foot vent.

The air conditioner for the vehicle may further include a controller that controls the door driving unit to close all of the defrost door, the face door, and the foot door so that a rear console dedicated mode in which air is discharged only toward the rear console vent, is able to be established.

The air conditioning case may further include a guide member that guides air to the rear console vent.

The guide member may be disposed between the rear console duct inlet that interacts with the rear console vent and the face duct inlet that interacts with the face vent, and the face door may be configured in such a way that, when the face door makes a turning movement, a turning end of the face door selectively contacts the guide member.

The guide member may include a contact protrusion that protrudes from the guide member and is provided at one side contacting the face door so as to maintain an airtight state with the face door and to restrict the turning movement of the face door.

The air conditioning case may further include a guide protrusion that is provided at the rear console duct inlet facing the guide member and guides air to the rear console vent.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
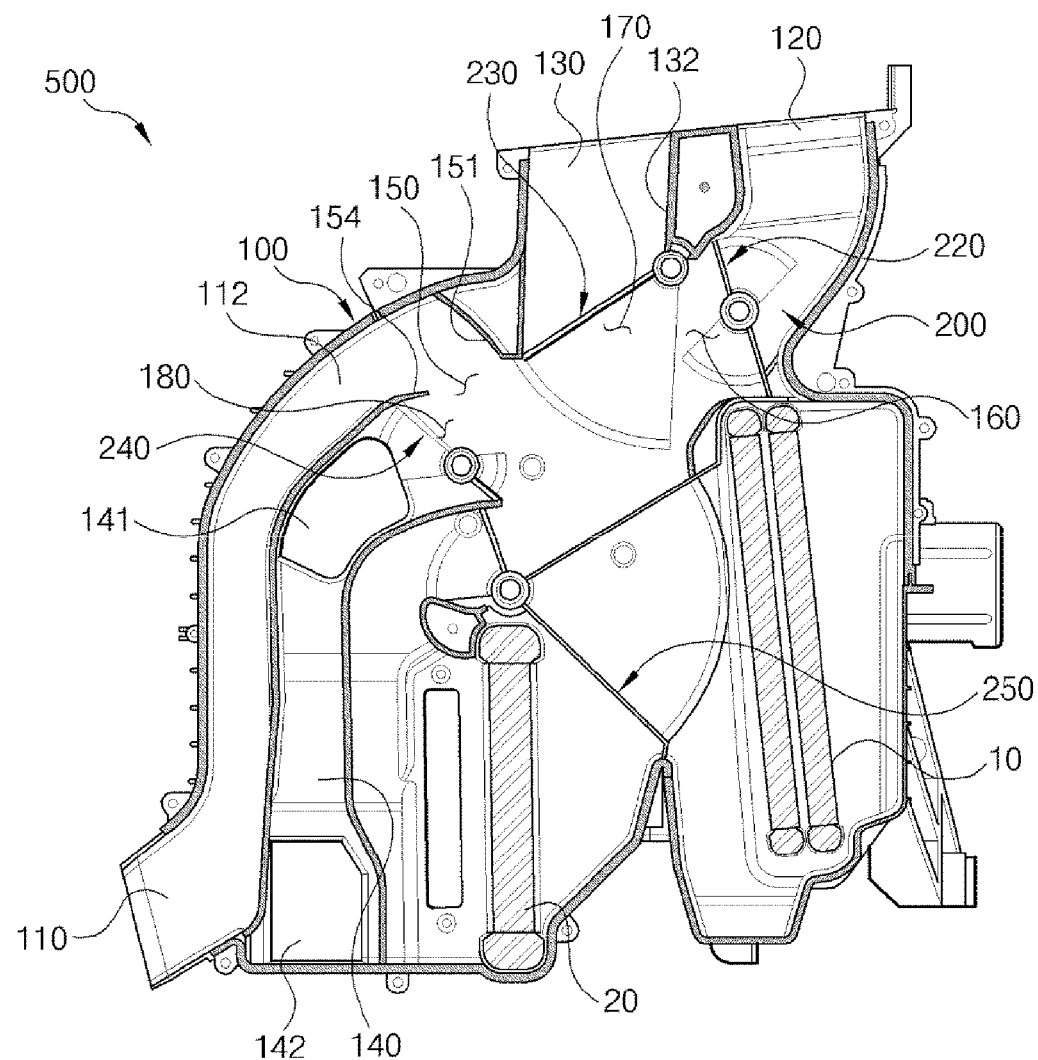
FIG. 1 is a cross-sectional view illustrating an internal structure of an air conditioner for a vehicle according to an embodiment of the present invention.
Figure 2:
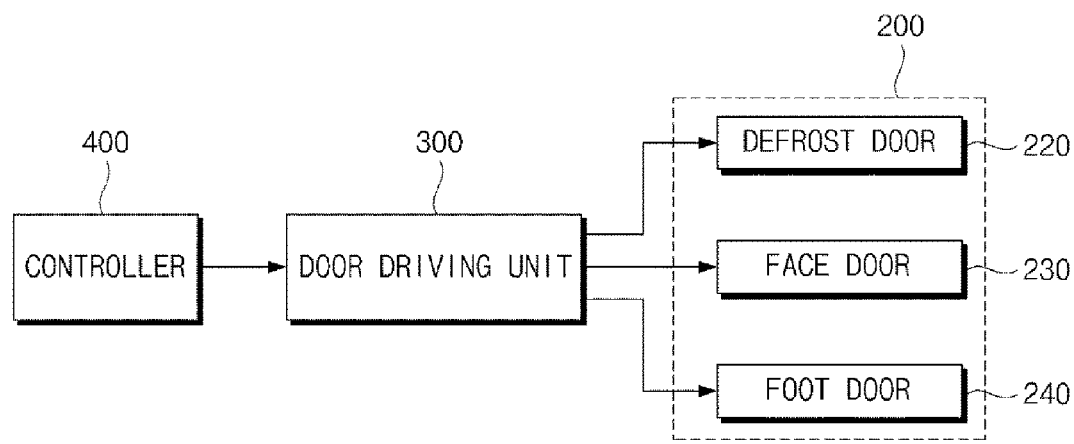
FIG. 2 is a block diagram illustrating control flow of a controller illustrated in FIG. 1.
Figure 3:
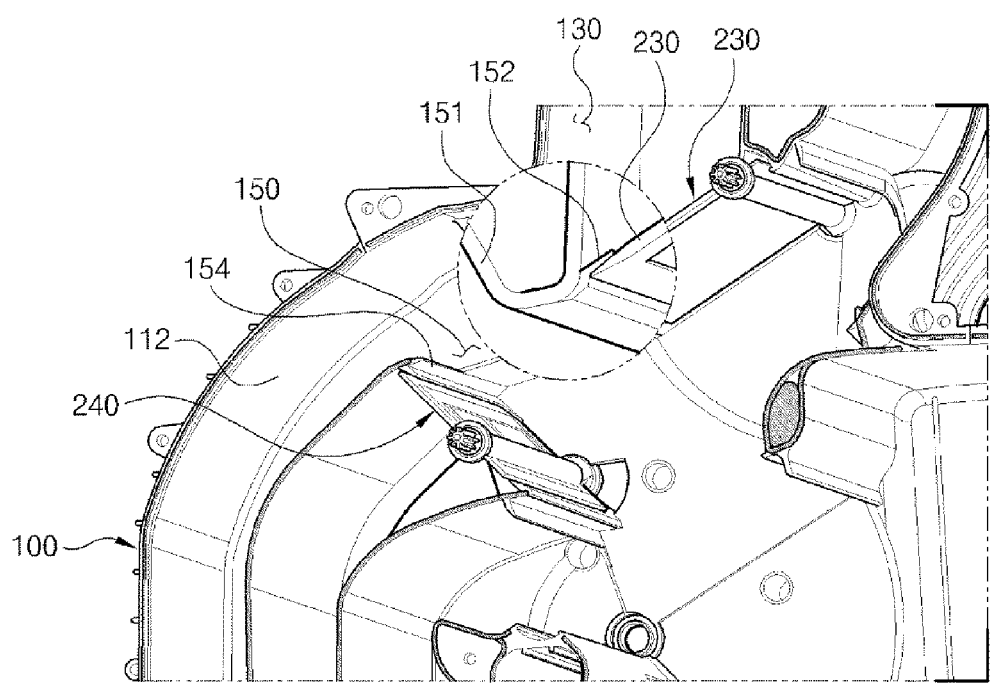
FIG. 3 is a cross-sectional view illustrating a guide member illustrated in FIG. 1.
Figure 4:
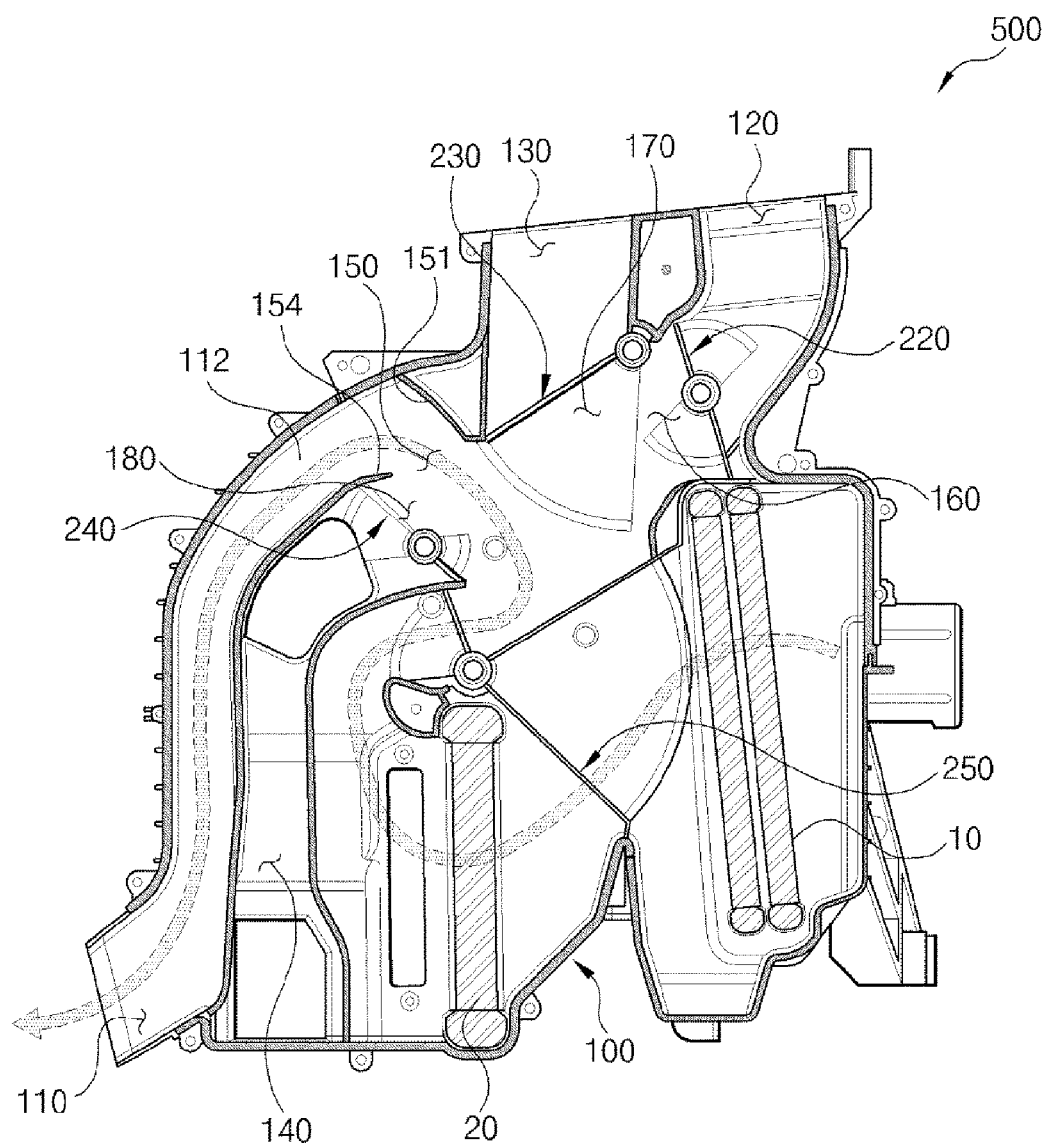
FIG. 4 is a cross-sectional view illustrating air flow in a rear console dedicated mode of the air conditioner for the vehicle of FIG. 1.

FIG. 1 is a cross-sectional view illustrating an internal structure of an air conditioner for a vehicle according to an embodiment of the present invention, FIG. 2 is a block diagram illustrating control flow of a controller illustrated in FIG. 1, FIG. 3 is a cross-sectional view illustrating a guide member illustrated in FIG. 1, and FIG. 4 is a cross-sectional view illustrating air flow in a rear console dedicated mode of the air conditioner for the vehicle of FIG. 1.

First, referring to FIG. 1, an air conditioner for a vehicle 500 according to an embodiment of the present invention includes an air conditioning case 100, a door unit 200, and a door driving unit 300.

The air conditioning case 100 has a structure in which air introduced through an inlet is discharged toward each usage source of the vehicle, and includes a defrost vent 120 that discharges air toward front windows of the vehicle, a face vent 130 that discharges air toward upper parts of front seats of the vehicle, a front foot vent 141 that discharges air toward the bottom of the front seats of the vehicle, a rear foot vent 142 that discharges air toward the bottom of rear seats of the vehicle, and a rear console vent 110 that discharges air toward upper parts of the rear seats of the vehicle. Here, the air conditioning case 100 includes a rear console duct 112 that guides air to the rear console vent 110, a face duct 132 that guides air to the face vent 130, and a foot duct 140 that guides air to the front foot vent 141 and the rear foot vent 142.

Meanwhile, an evaporator 10 and a heater core 20 are mounted in the air conditioning case 100, and the configuration of the air conditioner for the vehicle including the evaporator 10, the heater core 20, and a temperature door 250 corresponds to the configuration of a well-known air conditioner for a vehicle and thus detailed descriptions thereof will be omitted. Hereinafter, a configuration that is different from the well-known air conditioner for the vehicle will be described.

The door unit 200 includes a defrost door 220, a face door 230, and a foot door 240, which are rotatably disposed in the air conditioning case 100 and adjust a degree of openness of each of the defrost vent 120, the face vent 130, and the front and rear foot vents 141 and 142.

The air conditioner for the vehicle 100 has no door that adjusts a degree of openness of an inlet 150 of the rear console duct 112 that interacts with the rear console vent 110. Thus, no additional rear console dedicated door and no dedicated actuator are added so that manufacturing cost can be remarkably reduced, thus being economical.

In this way, since the air conditioner for the vehicle 500 does not include an additional door or device in the inlet 150 of the rear console duct 112, an outlet and a passage of the rear console duct 112, air is always discharged toward the rear console vent 110 and thus air is discharged toward rear seats through the rear console vent 110 in all air conditioning modes so that an air conditioning efficiency of the entire interior of the vehicle can be improved.

The inlet 150 of the rear console duct 112 described above may be placed between a face duct inlet 170 that interacts with the face vent 130 and a foot duct inlet 180 that interacts with the foot vents 141 and 142. However, if air controlled by the temperature door 250 can be always discharged, the position of the inlet 150 of the rear console duct 112 is not limited to the position between the face duct inlet 170 and the foot duct inlet 180. Meanwhile, unexplained reference numeral 160 represents an inlet of the defrost vent 120.

Thus, as described above, since no additional door or device is provided in the inlet 150 of the rear console duct 112 and the outlet and passage of the rear console duct 112, air controlled by the temperature door 250 can be always introduced.

Referring to FIG. 2, the door driving unit 300 individually drives and controls the defrost door 220, the face door 230, and the foot door 240, which are rotatably disposed in the air conditioning case 100 and adjust a degree of openness of each of the defrost vent 120, the face vent 130, and the front and rear foot vents 141 and 142, thus establishing various air conditioning modes. Here, although not shown, the door driving unit 300 includes a mode cam that interlocks with the doors and an actuator that selectively rotates and drives the mode cam, wherein the mode cam is link-coupled to a rotation shaft of each door and if the mode cam is rotated by the actuator, each door rotates in correspondence with each rotation shaft so that a degree of openness of each door can be adjusted. Here, detailed descriptions of the door driving unit 300 correspond to those of well-known door driving unit and thus will be omitted.

Meanwhile, the air conditioner 500 for the vehicle according to the current embodiment of the present invention may further include a controller 400. The controller 400 controls the door driving unit 300 so that various air conditioning modes can be established depending on the state of the vehicle or user's selection. Here, the various air conditioning modes may be classified into a face mode in which air is discharged toward the face vent 130, a defrost mode in which air is discharged toward the defrost vent 120, and a foot mode in which air is discharged toward the foot vent 140. Detailed descriptions thereof are similar to those of well-known air conditioning modes and thus will be omitted.

Referring to FIG. 3, the air conditioning case 100 includes a guide member 151 that guides air to the rear console vent 110. The guide member 151 guides air to the rear console vent 112, makes the flow of air smooth, and reduces air flow noise.

The guide member 151 has a plate shape and is slantly disposed between the inlet 150 of the rear console duct 112 that interacts with the rear console vent 110 and the inlet 170 of the face duct 132 that interacts with the face vent 130 so as to guide air to the rear console duct 112.

The face door 230 is configured in such a way that, when making a turning movement, if the face vent 130 is closed, a turning end of the face door 230 is in contact with the guide member 151 and maintains an airtight state with the face door 230.

The guide member 151 is formed to a length corresponding to the turning end of the face door 230 at one side contacting the face door 230, and a contact protrusion 152 protrudes from the guide member 151 so as to maintain an airtight state with the face door 230 and to restrict the turning movement of the face door 230.

In the drawing, the contact protrusion 152 is formed integrally with the guide member 151 and protrudes from the face door 230 not to disturb air flow. In this case, a protrusion height and a protrusion angle of the contact protrusion 152 may be designed and modified in various ways so as to correspond to an operation of the face door 230 and air flow.

The air conditioning case 100 includes a guide protrusion 154 that is provided at the inlet 150 of the rear console duct 112 that faces the guide member 151 and guides air to the rear console vent 110. Here, the guide protrusion 154 is formed integrally with the rear console duct 112 and protrudes from the air conditioning case 100 so as to contact the foot door 240 and to maintain an airtight state with the foot door 240 when the foot door 240 is closed. Also, the guide protrusion 154 protrudes from the air conditioning case 100 not to disturb air flow caused by flow resistance in the air conditioning case 100, and if the above-described purpose can be achieved, various structures may be established.

Meanwhile, the air conditioner for the vehicle 500 includes a rear console dedicated mode in which air is discharged only toward the rear console vent 110, as an air conditioning mode.

Referring to FIG. 4, the rear console dedicated mode represents a mode in which all of the defrost door 220, the face door 230 and the foot door 240 are closed and air is discharged only toward the rear console vent 110. Thus, since the air conditioner for the vehicle 50 establishes the rear console dedicated mode in which all air is discharged only toward the rear console vent 110, air conditioning control of front and rear seats of the interior of the vehicle can be more efficiently performed.

As described above, since the air conditioner for the vehicle 500 does not need to add an additional rear console dedicated mode and a dedicated actuator, manufacturing cost can be remarkably reduced and thus an economical effect can be provided, and air is always discharged toward the rear console vent 110 so that an air conditioning efficiency of the entire interior of the vehicle can be improved, and the rear console dedicated mode can be established so that air conditioning control of the front and rear seats of the interior of the vehicle can be more efficiently performed.

As described above, an air conditioner for a vehicle according to the present invention has the following effects.

First, no additional dedicated door and no actuator through which air is discharged toward a rear console duct are installed so that manufacturing cost can be reduced and thus an economical feasibility can be achieved and a structure of the air conditioner for the vehicle is simplified and thus productivity can be improved.

Second, since air can be discharged toward rear seats through the rear console duct in all modes at normal times, an air conditioning efficiency of the entire interior of the vehicle can be improved.

Third, front and rear air conditioning control can be more efficiently performed in a rear console dedicated mode in which all air is discharged toward the rear console vent.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. An air conditioner for a vehicle, comprising:
an air conditioning case comprising a rear console duct which introduces air toward a rear console register, a defrost register through which air is discharged toward a front window, a face register through which air is discharged in a direction of a front passenger, and a foot register through which air is discharged in a foot direction of front and rear seats; and
a door unit comprising a defrost door, a face door, and a foot door that are rotatably disposed in the air conditioning case and adjust a degree of openness of each of the defrost register, the face register, and the foot register,
wherein an inlet of the rear console duct that is in fluid communication with the rear console register is located at a position where conditioned-air which passes through an evaporator and a heater core flows, wherein the inlet of the rear console is always opened such that the conditioned-air is always introduced into the rear console duct when the air conditioner is operated,
wherein the inlet of the rear console duct is placed between a face duct inlet that is in fluid communication with the face register and a foot duct inlet that is in fluid communication with the foot register,
wherein the air conditioning case further comprises a guide member that guides the conditioned-air to the rear console register through the rear console duct,
the guide member is disposed between the rear console duct inlet that is in fluid communication with the rear console register and the face duct inlet that is in fluid communication with the face register, and the face door is configured in such a way that, when the face door makes a turning movement, an end of the face door selectively contacts the guide member.
2. The air conditioner for the vehicle of claim 1, wherein all of the defrost door, the face door, and the foot door are configured to be closed in a first operation mode so that the conditioned-air is discharged only toward the rear console register through the rear console duct in the first operation mode.
3. The air conditioner for the vehicle of claim 1, wherein the guide member comprises a contact protrusion that protrudes from the guide member and is provided at one side contacting the face door so as to maintain an airtight state with the face door and to restrict the turning movement of the face door.
4. The air conditioner for the vehicle of claim 1, wherein the air conditioning case further comprises a guide protrusion that is provided at the inlet of the rear console duct facing the guide member and guides air to the rear console register.

* * * * *